United States Patent [19]

Kitagawa et al.

[11] 4,281,917
[45] Aug. 4, 1981

[54] INFORMATION DISPLAY DEVICE FOR CAMERA

[75] Inventors: Masahiro Kitagawa; Michiharu Saito, both of Hachioji, Japan

[73] Assignee: Olympus Optical Co., Ltd., Tokyo, Japan

[21] Appl. No.: 35,981

[22] Filed: May 4, 1979

[30] Foreign Application Priority Data

May 4, 1978 [JP] Japan ................................. 53-53443

[51] Int. Cl.³ .......................... G03B 17/18; G08B 1/08
[52] U.S. Cl. ................................... 354/289; 354/60 E; 340/309.1; 340/377
[58] Field of Search ...................... 354/23 R, 53, 60 E, 354/60 L, 60 R, 289; 340/309.1, 377; 356/218; 352/170, 171

[56] References Cited

U.S. PATENT DOCUMENTS

| | | | |
|---|---|---|---|
| 3,367,251 | 2/1968 | Furuta | 354/60 R |
| 3,646,859 | 3/1972 | Umemura | 354/60 E |
| 3,648,581 | 3/1972 | Umemura | 354/289 X |
| 3,776,625 | 12/1973 | Fountain | 352/170 |
| 3,879,137 | 4/1975 | Sakazaki et al. | 356/218 |
| 3,918,069 | 11/1975 | Urano | 354/23 R |

FOREIGN PATENT DOCUMENTS 1463859 2/1977 United Kingdom .

*Primary Examiner*—L. T. Hix
*Assistant Examiner*—William B. Perkey

[57] ABSTRACT

An information display device for a camera which comprises a power source, an information display circuit, a timer circuit, and switch means for operating the timer circuit to connect the information display circuit to the power source for a fixed time. The switch means includes a first switch which is turned on while being shifted from an OFF to ON position, a second switch connected in series with the first switch, and a third switch connected in parallel with the second switch and interlocking with the first switch. The third switch is so designed as to be turned on to operate the timer circuit while the first switch is shifted from the OFF to ON position and to be already turned OFF when the first switch is brought to the ON position. Preferably, the first and third switches are rotary switches with a common movable contact, and the second switch is a self-restoring switch, such as a push switch.

9 Claims, 6 Drawing Figures

INFORMATION DISPLAY DEVICE FOR CAMERA

BACKGROUND OF THE INVENTION

This invention relates to an information display device for camera.

Cameras now on the market are provided with a display device for displaying information such as shutter speed. An example of prior art camera information display devices is comprised of an on-off display switch and a display circuit. In this example, the display circuit is connected to a power supply to display information when the display switch is turned on. With such display device, however, the display switch often fails to be turned off after information check, thereby quickening the exhaustion of a battery. Another example of the display device is comprised of, for example, a self-restoring switch associated with a film-wind lever and a display circuit. According to this display device, however, the switch need be operated for every check of information, and may possibly be depressed from some unexpected cause while a camera is cased and carried, thereby needlessly operating the display circuit.

Moreover, as still another example, there is known a display device which is comprised of a display push switch disposed on an easy-to-handle portion of a camera body, a timer circuit, and a display circuit. In this display device, when the display switch is turned on, the timer circuit connects the display circuit to the power supply for information dispaly for a fixed time. The display device is so constructed that the display circuit may operate for every operation of the display switch, so that the display circuit will operate each time the display switch is unexpectedly turned on while the camera is cased and carried.

In the aforesaid prior art display devices, excessive power consumption attributable to an undesired display circuit operation is not very great when using a pointer display circuit with relatively small current consumption. When using instead of a pointer a light emitting element such as a light emitting diode (LED) which consumes a relatively large current, however, the excessive power consumption would be increased to shorten the life of a battery used.

SUMMARY OF THE INVENTION

An object of this invention is to provide a camera information display device with a switch mechanism to reduce excessive power consumption in a display circuit.

According to the invention, there is provided a camera information display device comprising a power source, an information display circuit, a timer circuit, and switch means for operating the timer circuit to connect the information display circuit to the power source for a fixed time, the switch means including a first switch turned on while being shifted from an OFF to ON position, a second switch connected in series with the first switch, and a third switch connected in parallel with the second switch and interlocking with the first switch. The third switch is so arranged as to be turned on, while the first switch is shifted from the OFF to ON position, to cause the timer circuit to connect the information display circuit to the power source for the fixed time, and to be already turned off when the first switch is brought to the ON position.

The switch means may further include a fourth switch which is turned on, while the first switch is shifted from the OFF to ON position, to connect a battery checker circuit to the power source, and turned off before the first and third switches are turned on.

Preferably, the first, third and fourth switches are rotary switches with a common movable contact, and the second switch is a self-restoring push switch.

DETAILED DESCRIPTION OF THE PREFERRED EMBODIMENTS

Figure 1:
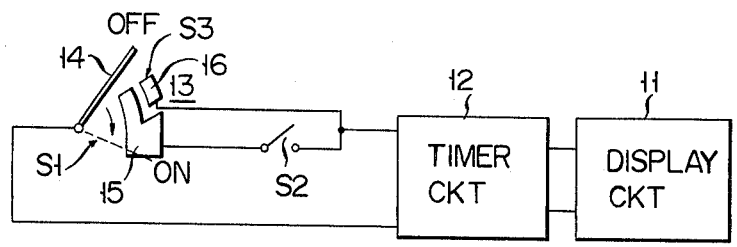
FIG. 1 shows the basic arrangement of a camera information display device according to an embodiment of this invention.

FIG. 1 shows the basic arrangement of the device of this invention, comprised of an information display circuit 11, a timer circuit 12, and operating instruction switch means 13 for applying an operating instruction to the timer circuit 12 to connect the display circuit 11 with a power supply for information display for a fixed time.

The switch means 13 includes a main switch S1 and a display push-switch S2 connected in series with each other. When both these switches S1 and S2 are turned on, an operating instruction is given to the timer circuit 12. The main switch S1, which may be of a rotary type, is formed of movable and fixed contacts 14 and 15 which are so constructed that the movable contact 14 may touch the fixed contact 15 to turn the switch S1 on while the movable contact 14 is shifted from OFF to ON position. Further, a fixed contact 16 is provided to form a switch S3 ganged with the switch S1, employing the movable contact 14 in common. The switch S3 is connected in parallel with the switches S1 and S2. The switch S3 is so constructed as to be turned on together with the switch S1 while the movable contact 14 is shifted from the OFF to ON position and to be turned off before the movable contact 14 is brought to the ON position. Thus, the switch S3 is once turned on while the movable contact 14 is shifted from the OFF to ON position, so that the operating instruction is given to the timer circuit 12 to bring the display circuit 11 into the display state for the fixed time even though the switch S2 is off. When the movable contact 14 is in the ON position, the switch S3 is off. In this state, the operating instruction is supplied to the timer circuit 12 for every operation of the switch S2. The display switch S2 may be located on an easy-to-handle portion of a camera body. As an alternative, the switch S3 may be arranged in series with the switch S1 and in parallel with the switch S2.

In the aforementioned basic arrangement, the main switch S1 is connected in series with the display switch S2, so that the display circuit will never operate if the display switch S2 is turned on when the camera is cased or carried, as long as the main switch S1 is off. In order to actuate the display circuit by operating the switch S2, however, the switch S1 should be operated. While the switch S1 is shifted from the OFF to ON position, the switch S3 is allowed to be on for a short time, whereby the operating instruction is given to the timer circuit 12. That is, the display circuit 11 may be satuated without operating the switch S2.

Figure 2:
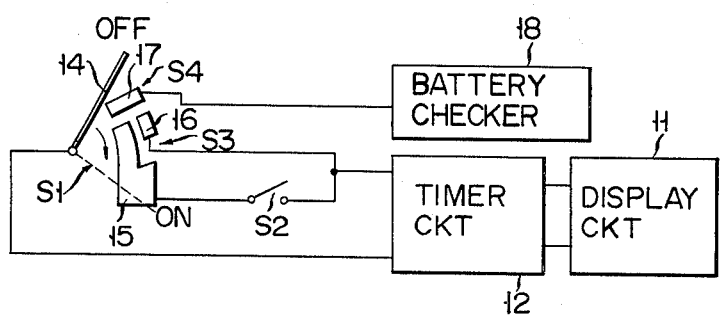
FIG. 2 shows the basic arrangement of a camera information display device according to another embodiment of the invention.

In the embodiment of FIG. 2, there is provided a fixed contact 17 constituting a switch S4 which is turned on and off before the switches S1 and S3 are turned on while the movable contact 14 is shifted from the OFF to ON position. By the use of such switch S4, an operating instruction may be given to a battery checker 18 for a short-time battery check while the movable contact 14 is shifted from the OFF to ON position.

Figure 3:
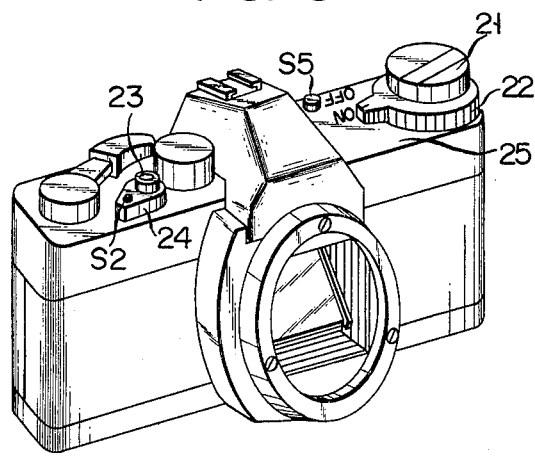
FIG. 3 is an exterior view of a camera body provided with switches as shown in FIG. 2.

FIG. 3 shows a camera body, in which the main switch S1 may be so formed as to be operated by control member 22 rotatably mounted under a film-rewind knob/crank 21 and coaxial with a rewind shaft rotated by means of the crank 21. The display switch S2 may be located on a button seat 24 on which a shutter-release button 23 is mounted. Moreover, a battery check switch S5 for an independent battery check may be disposed on a top cover 25.

Figure 4:
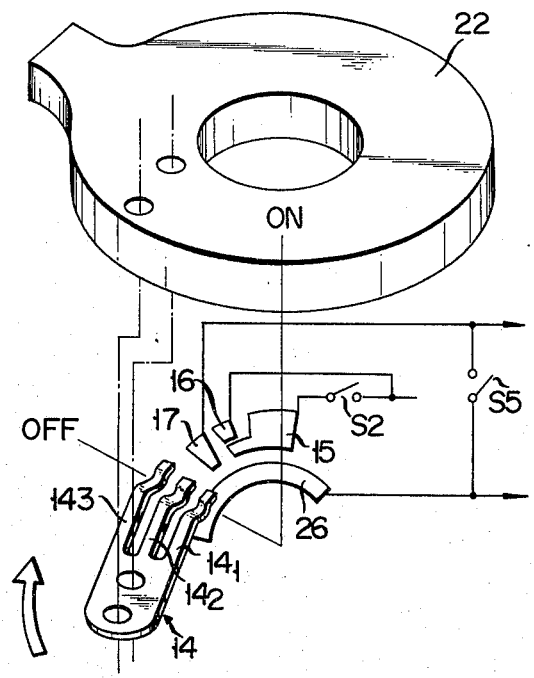
FIG. 4 schematically shows a practical arrangement of a main switch portion as shown in FIG. 2.

FIG. 4 shows an example of the mechanism of the main switch portion. The movable contact 14 coupled to the control member 22 by a suitable means to rotate with the control member 22 is constructed in the form of a fork having first, second and third bladelike contact portions $14_1$, $14_2$ and $14_3$. The first contact portion 14 is always in touch with a common fixed contact 26 arcuately formed with the axis of rotation as a center. The second contact portion $14_2$ comes into touch successively with the fixed contact 17 for battery check and the fixed contact 15 for the main switch while the movable contact 14 is shifted from the OFF to ON position. Meanwhile, the third contact portion $14_3$ comes into touch with the fixed contacts 17, 16 and 15 in order.

The second and third contact portions $14_2$ and $14_3$ are so designed as respectively to touch the fixed contacts 15 and 16 at substantially the same time. However, the third contact portion $14_3$ may be so formed as to touch the fixed contact 16 a little behind the touch of the second contact portion $14_2$ with the fixed contact 15.

Figure 5:
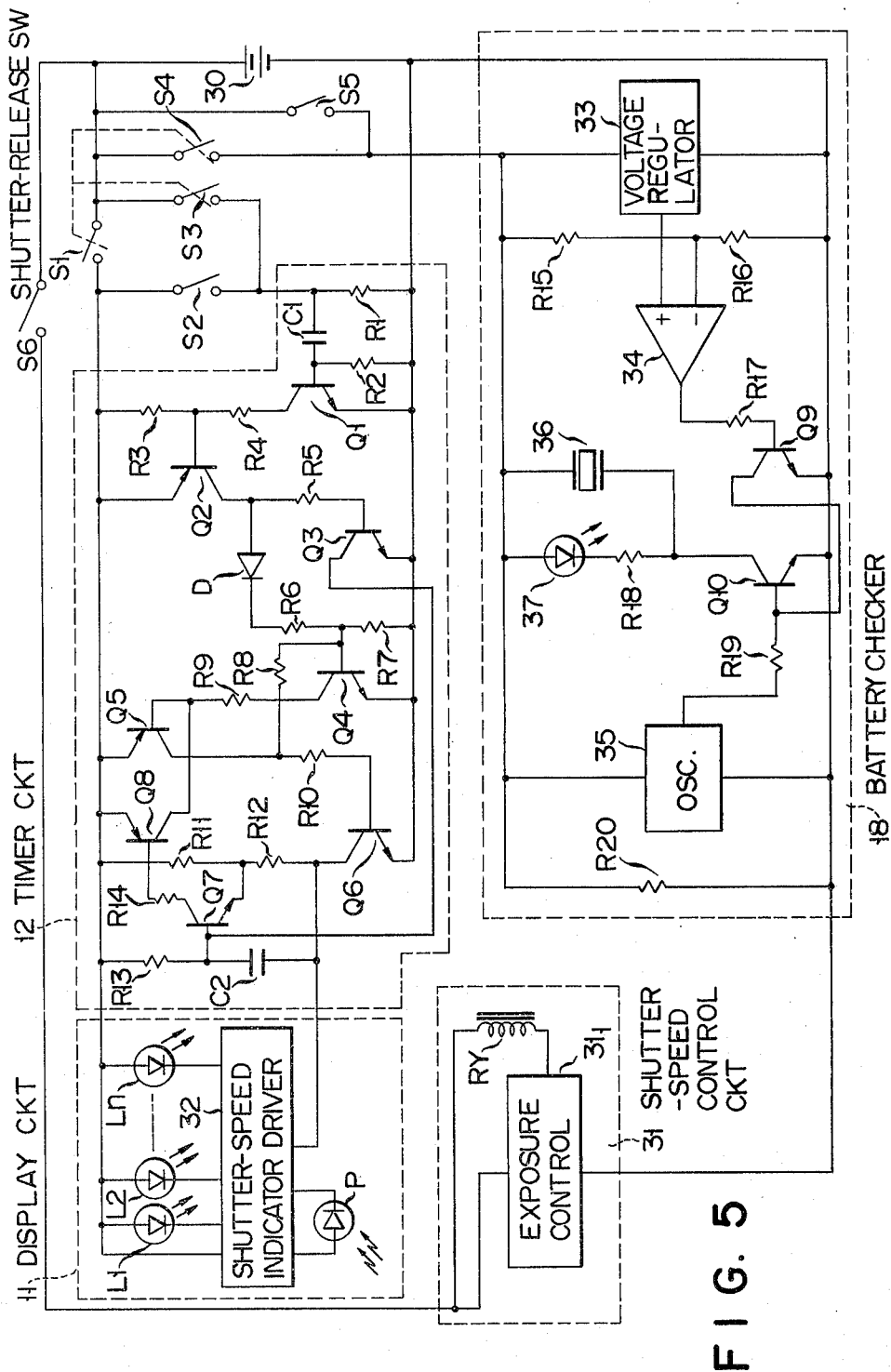
FIG. 5 is a circuit diagram corresponding to the embodiment of FIG. 2.

FIG. 5 shows a circuit corresponding to the embodiment of FIG. 2. In this circuit, a power source (battery) 30 is connected to the timer circuit 12 through the switches S1, S2 and S3, and to the battery checker circuit 18 through the switches S4 and S5. As mentioned before, the switches S1, S3 and S4 are ganged with each other. The power source 30 is connected to a shutter-speed control circuit 31 through a shutter-release switch S6.

The timer circuit 12 shown in FIG. 5 is comprised of transistors Q1 to Q8, a diode D, resistors R1 to R14, and capacitors C1 and C2. The display circuit 11 is comprised of a shutter-speed indicator driver 32, a plurality of light emitting diodes L1 to Ln, and a photo diode P, and connected to the power source 30 via the main switch S1 and the normally nonconducting transistor Q6. Accordingly, as long as the transistor Q6 is nonconducting, the display circuit 11 is disconnected from the power source and thus kept inoperative, even though the main switch S1 is on.

The battery checker circuit 18 is comprised of a voltage regulator 33, voltage comparator 34, oscillator 35, light emitting diode 37, piezoelectric ceramic vibrator 36, transistors Q9 and Q10, and resistors R15 to R20.

When the switches of the aforementioned arrangement are operated, the battery check switch S4 is first turned on for a short time. Then, the power source 30 is connected to the battery checker circuit 18. In the battery checker circuit 18, a constant output voltage from the voltage regulator 33 is compared by the voltage comparator 34 with an output voltage from a voltage divider circuit consisting of the resistors R15 and R16 which has a level depending on the present voltage level of the battery 30. If the output voltage of the voltage divider circuit is higher than that of the voltage regulator 33, the voltage comparator 34 renders the transistor Q9 nonconductive. Accordingly, the transistor Q10 is repeatedly turned on and off by an output signal from the audio frequency oscillator 35 with the result that the light emitting diode 37 turns on and off, and the ceramic vibrator 36 sounds to indicate that the supply voltage is high enough. On the other hand, if the output voltage of the voltage regulator 33 is higher than that of the voltage divider circuit, the voltage comparator 34 causes the transistor Q9 to conduct. Since the transistor Q10 is rendered nonconductive by the conduction of transistor Q9, the light emitting diode 37 does not light, and the vibrator 36 does not sound. Thus, it can be noticed that the supply voltage has dropped below a predetermined level. The resistor R20 is a dummy resistor which tends to cause a voltage drop to substantially the same degree as a voltage drop caused by the display circuit 11 or shutter-speed control circuit 31 when it is operated.

The switches S1 and S2 are turned on simultaneously after the short-time battery check is accomplished. When the switch S3 is turned on, a differentiated pulse is produced by a differentiation circuit formed of the resistors R1 and R2 and the capacitor C1, thereby causing the transistor Q1 to conduct. Since the potential at the node of resistors R3 and R4 is lowered by the conduction of transistor Q1, the transistors Q2 and Q3 are allowed to conduct. When the transistor Q2 conducts, the transistors Q4 and Q5 is allowed to conduct by a voltage drop caused in the resistor R7 by the collector current of transistor Q2. The conduction of transistor Q5 causes the transistor Q6 to conduct. Since the transistors Q4 and Q5 have their bases and collectors cross-coupled to form a hold circuit, the transistors Q4, Q5 and Q6 are kept in conduction after the transistors Q1, Q2 and Q3 are rendered nonconductive.

As mentioned before, the display circuit 11 is connected to the power supply 30 by the conduction of transistor Q6. Also, the conduction of transistor Q6 causes the capacitor C2 of a time constant circuit comprised of the transistors Q7 and Q8, resistors R11 to R14 and capacitor C2 to be charged through the resistor R13. When the voltage across capacitor C2 exceeds a predetermined level, the transistors Q7 and Q8 conduct. The conduction of transistor Q8 short-circuits the emitter-base path of transistor Q5 of the hold circuit, thereby rendering the transistor Q5 nonconductive. In consequence, the transistors Q4 and Q6 are also rendered nonconductive, and the display circuit 11 is disconnected from the power source 30. Namely, the display circuit 11 is allowed to be connected to the power supply for a fixed time depending on a time constant determined by values of the resistor R13 and the capacitor C2 of the time constant circuit.

Figure 6:
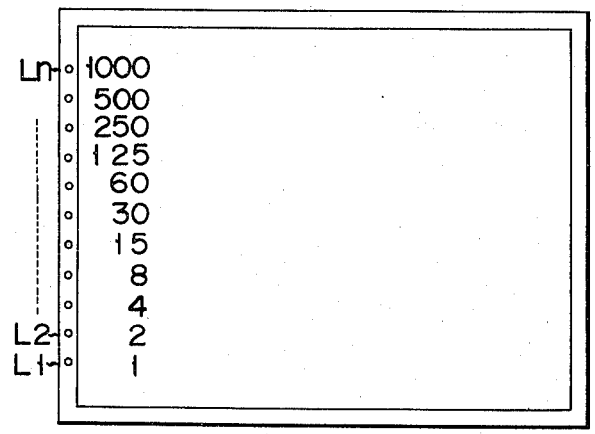
FIG. 6 shows a relationship between information and light-emitting elements in a display circuit as shown in FIG. 5.

In the display circuit 11, a measuring circuit including the light sensing element P such as a photo diode in a viewfinder portion of the camera, when connected to the power supply, measures the brightness of an object to be photographed and determines a shutter speed in accordance with the brinightness. One of the light emitting diodes L1 to Ln corresponding to respective shutter speeds is selected depending the determined shutter speed and connected to the power source to light. The light emitting diodes L1 to Ln may be arranged adjacently to their corresponding shutter-speed values displayed on the viewfinder as shown in FIG. 6, for example.

Every time the display switch S2 is turned on with the main switch S1 on, that is, with the movable contact 14 in the ON position, the transistors Q4, Q5 and Q6 of the hold circuit are caused to conduct, thereby connecting the display circuit 11 to the power source 30. At this time, the capacitor C2 of the time constant circuit is discharged, so that display circuit 11 is allowed to be connected to the power supply for the substantially fixed period of time determined by the time constant. When the battery check switch S5 is operated, battery check may be achieved independently of the operation of display circuit 11.

The shutter-speed control circuit 31 includes an exposure control circuit $31_1$ and an electromagnet Ry for an electronically controlled shutter. When the shutter-release button is depressed, an electric current flows through the electromagnet Ry to operate the shutter. The shutter time is automatically controlled by the exposure control circuit $31_1$.

According to this invention, as stated above, the main and display switches are connected in series with each other, so that a mere push of the display switch will not connect the display circuit to the power supply, preventing unnecessary power consumption. Moreover, since the display circuit may be operated for a short time while the main switch is shifted from the OFF to ON position without regard to the operation of the display switch by employing the additional switch ganged with the main switch, a camera information display device with a high operating capability and reduced power consumption can be provided.

What we claim is:

1. In an information display device for a camera, comprising a power source, an information display circuit, a timer circuit, and switch means for causing said timer circuit to connect said information display circuit to said power source for a predetermined period of time, said switch means comprising a first switch which is turned on while being shifted from an OFF position to an ON position, a second switch which is operated independently of the first switch and which renders said information display circuit operable only when the first switch is in ON state, and a third switch which is ganged with the first switch, said third switch being temporarily turned on while the first switch is being shifted from the OFF position to the ON position and turned off when the first switch reaches the ON position, thereby causing said timer circuit to connect said information display circuit to said power source for a predetermined period of time.

2. The information display device according to claim 1, wherein said third switch is connected in parallel to said second switch when said first switch is in an ON state.

3. The information display device according to claim 1, wherein said switch means further includes a fourth switch which is turned on to connect a battery checker circuit to said power source while said first switch is shifted from OFF to ON position, and turned off before said first and third switches are turned on.

4. The information display device according to claim 3, wherein said first, third and fourth switches are rotary switches with a common movable contact.

5. The information display device according to claim 1, wherein said second switch is a push switch.

6. The information display device according to claim 1, wherein said first and third switches are rotary switches with a common movable contact, and said second switch is a push switch.

7. The information display device according to claim 1 or 6, wherein said first and third switches are driven by a rotatable member coaxially mounted on a film-rewind shaft of the camera.

8. The information display device according to claim 3 or 4, wherein said first, third and fourth switches are driven by a rotatable member coaxially mounted on a film-rewind shaft of the camera.

9. The information display device according to claim 3, wherein said battery checker circuit includes a piezo-electric ceramic vibrator.

* * * * *